US010002077B2

(12) United States Patent
Zuckerman et al.

(10) Patent No.: US 10,002,077 B2
(45) Date of Patent: Jun. 19, 2018

(54) PERSISTENT MEMORY CONTROLLER BASED ATOMICITY ASSURANCE

(71) Applicant: Hewlett Packard Enterprise Development LP, Houston, TX (US)

(72) Inventors: Boris Zuckerman, Andover, MA (US); Vitaly M. Oratovsky, Andover, MA (US); Douglas L. Voigt, Boise, ID (US); Harold Woods, Colorado Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 4 days.

(21) Appl. No.: 15/113,897

(22) PCT Filed: Jan. 31, 2014

(86) PCT No.: PCT/US2014/014233
§ 371 (c)(1),
(2) Date: Jul. 25, 2016

(87) PCT Pub. No.: WO2015/116190
PCT Pub. Date: Aug. 6, 2015

(65) Prior Publication Data
US 2016/0350218 A1 Dec. 1, 2016

(51) Int. Cl.
*G06F 12/08* (2016.01)
*G06F 12/0815* (2016.01)
(Continued)

(52) U.S. Cl.
CPC .......... *G06F 12/0815* (2013.01); *G06F 9/526* (2013.01); *G06F 12/0804* (2013.01);
(Continued)

(58) Field of Classification Search
CPC ............. G06F 12/0815; G06F 12/0804; G06F 12/0891; G06F 2212/021; G06F 2212/608; G06F 2212/621
See application file for complete search history.

(56) References Cited

U.S. PATENT DOCUMENTS 7,613,743 B1 11/2009 Giampaolo et al.
8,001,307 B1 * 8/2011 Gole ................... G06F 11/2079
707/610
(Continued)

FOREIGN PATENT DOCUMENTS

WO WO-2013112634 A1 8/2013
WO WO-2013152598 A1 10/2013

OTHER PUBLICATIONS

Blattner, A. et al., Generic Crash-resilient Storage for Indigo and Beyond, Nov. 6, 2013, HP Laboratories, HPL-2013-75, 4 pages.
(Continued)

*Primary Examiner* — Hiep Nguyen
(74) *Attorney, Agent, or Firm* — Mannava & Kang, P.C.

(57) ABSTRACT

According to an example, PM controller based atomicity assurance may include receiving data that is related to an application for storage in a PM. PM controller based atomicity assurance may further include receiving an indication of an atomic transaction that is related to the data, and receiving an indication to generate a CP that is related to the atomic transaction. The CP may be generated in a PM staging area. A determination may be made as to whether the CP in the PM staging area is closed or open. In response to a determination that the CP in the PM staging area is closed, content related to the CP may be propagated to the PM.

15 Claims, 7 Drawing Sheets

(51) Int. Cl.
  *G06F 9/52* (2006.01)
  *G06F 12/0804* (2016.01)
  *G06F 12/0891* (2016.01)

(52) U.S. Cl.
  CPC .... *G06F 12/0891* (2013.01); *G06F 2212/608* (2013.01); *G06F 2212/621* (2013.01)

(56) References Cited

U.S. PATENT DOCUMENTS

| | | | |
|---|---|---|---|
| 8,296,271 | B1 | 10/2012 | Richardson et al. |
| 8,904,120 | B1* | 12/2014 | Killamsetti ............ G06F 13/00 707/692 |
| 2003/0084242 | A1* | 5/2003 | Strange ............... G06F 11/2082 711/114 |
| 2005/0246487 | A1 | 11/2005 | Ergan et al. |
| 2006/0200637 | A1* | 9/2006 | Galipeau ............ G06F 11/2097 711/162 |
| 2007/0022144 | A1* | 1/2007 | Chen ................... G06F 11/2064 |
| 2010/0106754 | A1 | 4/2010 | Condit et al. |
| 2010/0114848 | A1 | 5/2010 | McKelvie et al. |
| 2011/0307449 | A1 | 12/2011 | Cargille et al. |
| 2012/0323850 | A1* | 12/2012 | Hildebrand ....... G06F 17/30578 707/624 |
| 2016/0378672 | A1* | 12/2016 | Dulloor ............... G06F 12/0891 711/135 |

OTHER PUBLICATIONS

International Search Report & Written Opinion, dated Oct. 30, 2014, PCT Patent Application No. PCT/US2014/014233, 9 pages.
Park, S. et al., Failure-Atomic msync(): A Simple and Efficient Mechanism for Preserving the Integrity of Durable Data, Apr. 15-17, 2013, Eurosys' 13, Prague, Czech Republic, pp. 225-238.

* cited by examiner

PERSISTENT MEMORY CONTROLLER BASED ATOMICITY ASSURANCE

BACKGROUND

Persistent memory (PM) includes main memory that is implemented using non-volatile memory (NVM) technologies. NVM technologies typically include computer memory that has the ability to retain stored information even when not powered. Examples of PM include flash memory which is electrically erasable and reprogrammable, resistive random-access memory (RRAM), phase-change random access memory (PCRAM), and memristor based memory.

Atomicity is a property of a set of updates (e.g., a transaction), for example, between an application and a memory, which are guaranteed to either completely occur, or have no effect. In other words, in an atomic transaction, a series of operations either all occur, or nothing occurs. Therefore, a guarantee of atomicity prevents partial occurrence of updates, for example, to a memory. Further, a consistency point (CP) is a process of storing a number of complete atomic transactions to a stable media, such as a PM. Upon completion of the storage process, a system is considered to reach a CP.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
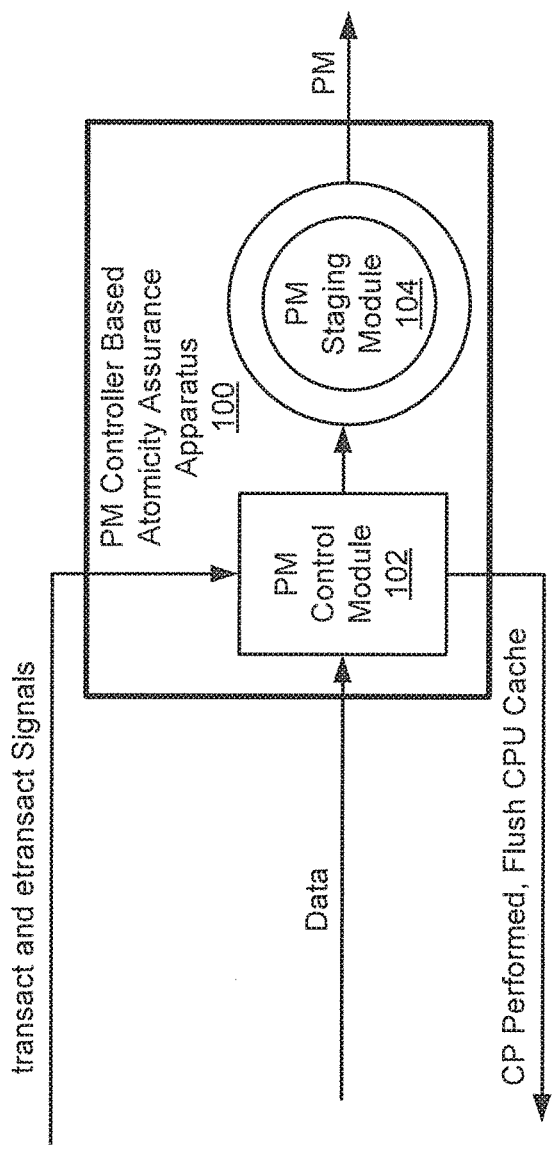
FIG. 1 illustrates an architecture of a persistent memory (PM) controller based atomicity assurance apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to PM, compared to volatile random access memory (RAM), PM may be used to expand the ability of applications to preserve their state, and may also allow applications to be restarted after power failure or a system crash (e.g., a malfunction). In the event of power failure or a system crash, the actual state that may be left in the PM may be unknown at certain times. For example, in the event of power failure or a system crash, the actual state that may be left in the PM may be unknown when an application is performing a set of related updates, when a central processing unit (CPU) flushes its cache into a PM controller, or when the PM controller moves data into PM cells of the PM.

With respect to power failure and other aspects (e.g., a system crash) that may lead to a sudden interruption of execution and reordering of updates during propagation between a CPU cache and the PM, in order to achieve a state when restart is possible without lengthy validation, an application may need to bring its data to a stable state. For example, a file system may perform three connected steps that include first, an allocation of space from a free pool of blocks, second, writing of data into the allocated space, and third, attachment of the allocated space to a file. If such a file system is interrupted between the first and third steps (i.e., when space is allocated, but is yet to be attached to a file), the processes associated with the first to third steps may include inaccuracies. If power is lost (or a system crash occurs) between the first and third steps, it may be preferable to restart the file system from the state prior to allocation of space. Moreover, when updates are performed with write-behind techniques, propagation of transactions may be performed out of order.

With respect to computing systems generally, computing systems may be built by combining multiple semi-autonomous components. In order to achieve desired productivity, computing systems may allow for parallelism in execution of tasks in those components. For example, a CPU that executes instructions of a running thread may at the same time pre-fetch more instructions into a near-line CPU instruction (I)-cache for possible further execution. Similarly, when a thread updates memory elements, such updates may be recorded first in a CPU data (D)-cache, and then at some later point, the updates may be propagated to a final destination. Such actions may allow aggregation of multiple updates into a single message. Applications working in such an environment and storing their state in PM may generally lack control over which portion of updates is actually committed, and which portion of updates is in a transient state. These aspects of computing systems may need to be considered for achieving a self-consistent state when facing the possibility of a sudden power loss or system crash. Further, the simultaneous execution of multiple unrelated applications and data flow over multiple cache related devices until the data reaches the PM may also need to be considered for achieving a self-consistent state when facing the possibility of a sudden power loss or system crash.

According to examples, a PM controller based atomicity assurance apparatus and a method for PM controller based atomicity assurance are disclosed herein. According to an example, the apparatus disclosed herein may generally include a PM control module (i.e., a PM controller) to receive data that is related to an application, where the data is to be stored in a PM. The PM control module may further receive an indication of an atomic transaction that is related to the data (e.g., a set of data modifications), and receive an indication (e.g., by the application, and/or based on a determination by the PM control module) to generate an explicit CP event that closes a current open CP and prepares data to be flushed to a final PM destination. A PM staging module of the PM controller based atomicity assurance apparatus may generate an implicit CP event based, for example, on an amount of data in the open CP, time since a last CP event, an amount of D-cache, and other factors. As part of an operational workflow, the PM staging module may propagate updates from closed CPs to the final PM destination. This may be performed in first in, first out (FIFO) order releasing resources associated with older staged CPs. Further, upon restart after computer failure or power off events, the PM staging area may discard all updates recorded in the open CP, and propagate updates from closed CPs to the final PM destination.

With respect to the apparatus and method disclosed herein, a CP event may be defined as a point in execution of an application with all updates made prior to the CP being committed to a closed PM staging area of the apparatus disclosed herein, and all other subsequent updates being excluded from the PM staging area. Logically, the CP may include all atomic transactions since a previous CP. When a PM control module of the PM controller based atomicity assurance apparatus disclosed herein is in the process of reaching the CP, the PM control module may block initiation of new transactions, and force flush a CPU cache (e.g., a CPU D-cache). Flushing the CPU cache may be relatively time consuming. Thus, flushing of the CPU cache may be performed on a limited basis, with the PM controller based atomicity assurance apparatus relying generally on naturally (i.e., without interruption by the PM controller based atomicity assurance apparatus) flowing stream of updates. The CP may also be explicitly requested (e.g., by an application), or otherwise, the CP may be triggered by the PM control module of the PM controller based atomicity assurance apparatus.

The apparatus and method disclosed herein may generally address power failure and other anomalies (e.g., a system crash) related to relationships between applications, CPU cache, PM cache, and data at rest in PM cells of the PM. The apparatus and method disclosed herein may also be applicable to achieving atomicity of multiple updates in environments with intelligent agents. The apparatus and method disclosed herein may provide consistency assurance of individual update transactions and their sequence orders, while avoiding frequent flushes of a CPU cache. The apparatus and method disclosed herein may prevent a last atomic update (or a plurality of last atomic updates) from being committed in the event of power failure or other anomalies. For example, the last atomic update may be lost together with several previous updates in the event of power failure or other anomalies. If an application is to reach a known CP, the application may issue a call, for example, by specifying a STABLE parameter in an etransact( ) signal. In such a case, all new update transactions may be blocked, running transactions may be allowed to proceed to the end, updates from the CPU cache may be flushed into a current open CP staging area, the current open CP staging area may be closed, and a new open CP may be activated for a new update transaction. The apparatus and method disclosed herein may allow applications to achieve atomicity of PM updates without journaling. The apparatus and method disclosed herein may implement automatic (e.g., without human intervention) or user defined CPs that may be used at restart time in the event of power failure or other anomalies.

Generally, the apparatus and method disclosed herein may add efficiency to the operation of applications since applications no longer need to make modifications twice and flush logs frequently. Thus, the apparatus and method disclosed herein may achieve atomicity of related updates in a multi-level caching environment by declaring update transactions and CPs. The apparatus and method disclosed herein may also allow CPUs to cache multiple updates to the same elements and minimize the frequency of CPU cache flushes.

FIG. 1 illustrates an architecture of a PM controller based atomicity assurance apparatus (hereinafter also referred to as "apparatus 100"), according to an example of the present disclosure. Referring to FIG. 1 and as described in further detail with reference to FIG. 2, the apparatus 100 is depicted as including a PM control module 102 to receive data that is related to an application, where the data is to be stored in a PM. The PM control module 102 may further receive an indication (e.g., via transact and etransact signals) of an atomic transaction that is related to the data, and receive an indication (e.g., by the application, and/or based on a determination by the PM control module) to generate a CP that is related to the atomic transaction. Further, the PM control module 102 may generate a CPU cache flush request and CP done (CP_Done) signal. With respect to calls from the application to transact( ) and etransact( ) functions that respectively generate the transact and etransact signals, the application may declare an atomic transaction that includes a set of interrelated changes of locations in the PM initiated by a single thread of execution, and limited by the transact( ) and etransact( ) signals. This set of interrelated changes may be treated as a single update for the purpose of recovery from a power loss or other anomalies. The PM control module 102 may aggregate and isolate updates.

A PM staging module 104 may generate the CP in a PM staging area as discussed in further detail with reference to FIG. 4. As also described in further detail with reference to FIG. 4, the PM staging module 104 may determine if the CP in the PM staging area is closed or open. In response to such determination, the PM staging module 104 may propagate content related to closed CPs to the PM and discard content of an open CP. For example, once the content related to closed CPs is propagated to the PM, the PM becomes self-consistent and content of the self-consistent PM may be used to restart the application, or other applications (e.g., in an event of an anomaly).

The modules and other elements of the apparatus 100 may be machine readable instructions stored on a non-transitory computer readable medium. In addition, or alternatively, the modules and other elements of the apparatus 100 may be hardware or a combination of machine readable instructions and hardware.

Figure 2:
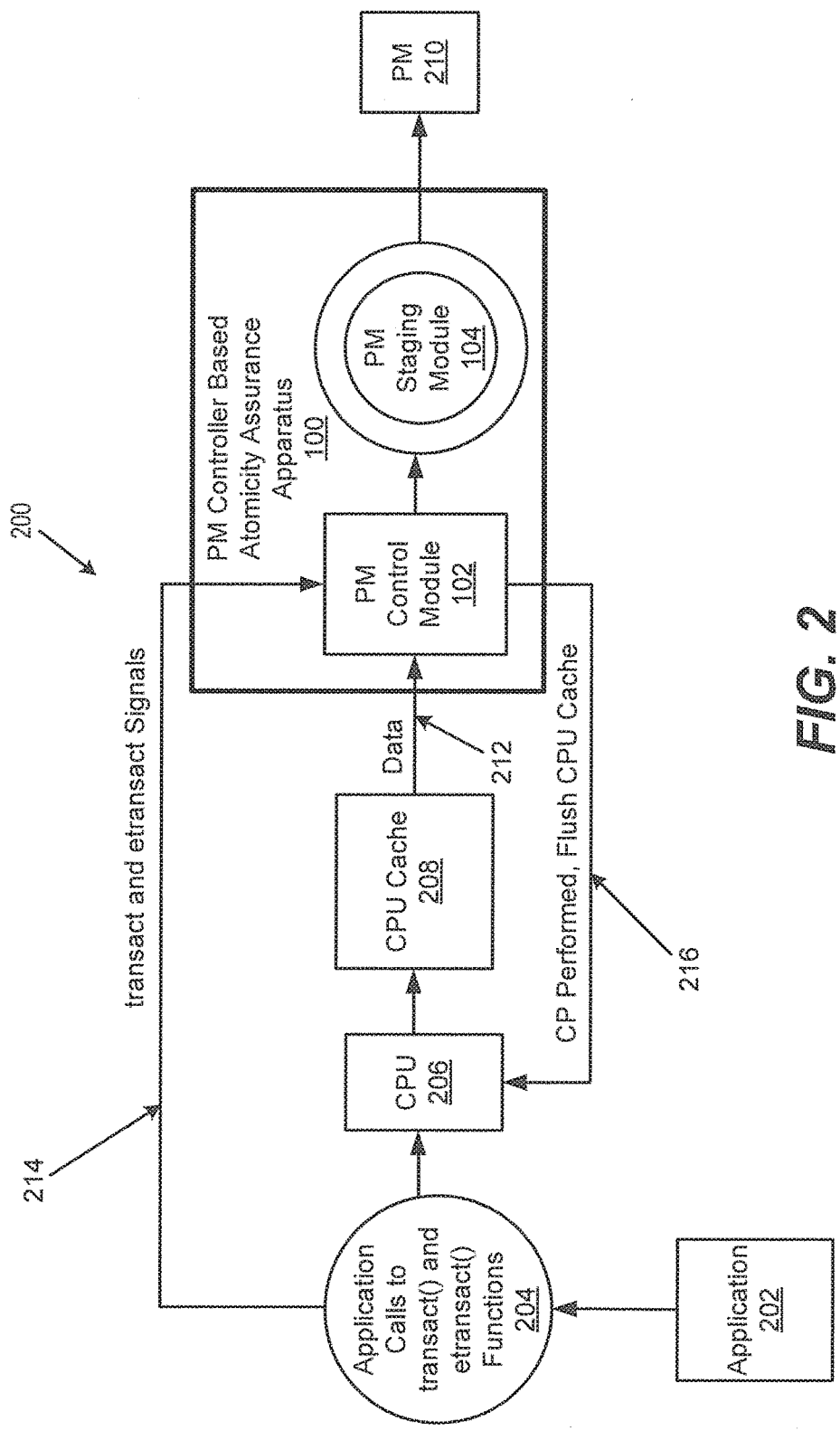
FIG. 2 illustrates an environment including the PM controller based atomicity assurance apparatus, according to an example of the present disclosure.

FIG. 2 illustrates an environment 200 including the PM controller based atomicity assurance apparatus 100, according to an example of the present disclosure. The environment 200 may generally include a set of logical components that may be involved in the propagation of atomic updates. The set of logical components may include application processes that include a set of instructions with additional demarcation of an atomic update transaction related to an application 202. For example, the instructions may include transact and etransact functions at 204. For example, update transactions (e.g., to a PM) may be declared by an application by invoking a transact( ) function. In other words, an application may specify a beginning of an atomic update by invoking the transact( ) function. An application may terminate the update transaction by invoking, for example, an etransact( ) function. In other words, an application may specify an end of an atomic update by invoking the etransact( ) function. Alternatively, update transactions may be also terminated by declaring a next transaction calling next transact( ).

The environment 200 may further include a CPU 206 to execute a set of application instructions, for example, for the application 202. A CPU cache 208 may hold pre-flushed (i.e., dirty) modifications. A PM 210 may represent main memory that is implemented using NVM technologies. The NVM technologies may include, for example, flash memory, RRAM, PCRAM, and memristor based memory. Furthermore, volatile memory, such as DRAM, may also be present in the environment 200.

The environment 200 may further include a logical data link (e.g., memory bus) 212 to forward modified data between the CPU cache 208 and the PM control module 102. The environment 200 may also include a direct memory access (DMA) controller module (not shown) to facilitate data transfer between the PM control module 102 and other devices. A logical control link 214 may be used by the application 202 to forward the transact and etransact signals to the PM control module 102. The PM control module 102 may maintain count of simultaneously active atomic update transactions. If this count is greater than zero, the PM control module 102 may block closing the open CP. The transact signal issued through the logical control link 214 may be blocked by the process of closing the open CP. An etransact signal with a STABLE indication may cause closing of the open CP, and also may be blocked by the PM control module 102. To avoid stalling CPUs, a logical link 216 from the PM control module 102 to the CPU 206 may raise exceptions to notify the CPU 206 that the flush of a CP is performed, or request the flush of all dirty content of the CPU cache 208.

The PM control module 102 may declare an explicit CP (i.e., closing an open CP) by specifying, for example, a STABLE parameter in the etransact( ) invocation by the application 202. The PM control module 102 may also implement implicit CPs (e.g., based on an amount of data in the open CP, time since a last CP event, an amount of D-cache, and other factors). Each transact and etransact call by the application 202 may be translated into the direct corresponding transact and etransact signals that are forwarded to the PM control module 102 via the logical control link 214. With respect to processing of the transact and etransact signals, the PM control module 102 may block the transact and/or etransact signals directly. Alternatively, the PM control module 102 may block the transact and/or etransact signals by a return blocking state until a previous CP is flushed to the PM 210.

Alternatively or additionally, with respect to processing of the transact and etransact signals, the PM control module 102 may increment or decrement a count of active (i.e., opened) transactions corresponding to the transact and etransact signals. For example, the PM control module 102 may track a number of simultaneously active transactions by incrementing a transaction count on the transact signal and decrementing the transaction count on the etransact signal.

Alternatively or additionally, with respect to processing of the transact and etransact signals, if the etransact signal needs a CP, the PM control module 102 may initiate an out-of-order consistency flush. Further, the PM control module 102 may block the etransact signal either directly or by a return blocking state until the CP is reached.

Alternatively or additionally, with respect to processing of the transact and etransact signals, if the blocking state was returned to an application, the PM control module 102 may issue an interrupt to notify the CPU 206 that a CP was reached so that processing may continue. An operating system (OS) scheduling unit (not shown) may determine how to wait for an interrupt associated with PM CPs. For example, the OS scheduling unit may try to switch context and allow threads that do not need PM transactions to continue (e.g., copying data from network interface controllers (NICs) or host bus adapters (HBAs)).

Figure 4:
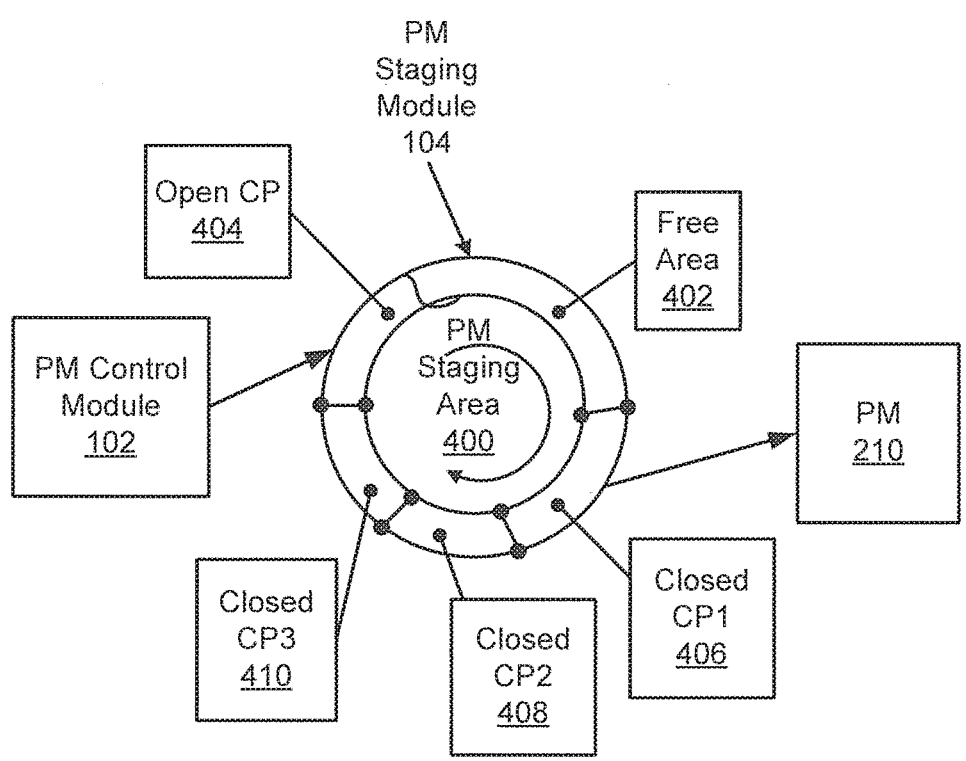
FIG. 4 illustrates a composition of a PM staging area for the PM controller based atomicity assurance apparatus, according to an example of the present disclosure.

To initiate an implicit CP, the PM control module 102 may track the amount of data placed into a staging buffer (e.g., a PM staging area 400 as discussed herein with reference to FIG. 4) of the PM staging module 104. Further, the PM control module 102 may track the time since the last CP in order to initiate CP flush at the appropriate time.

Figure 3:
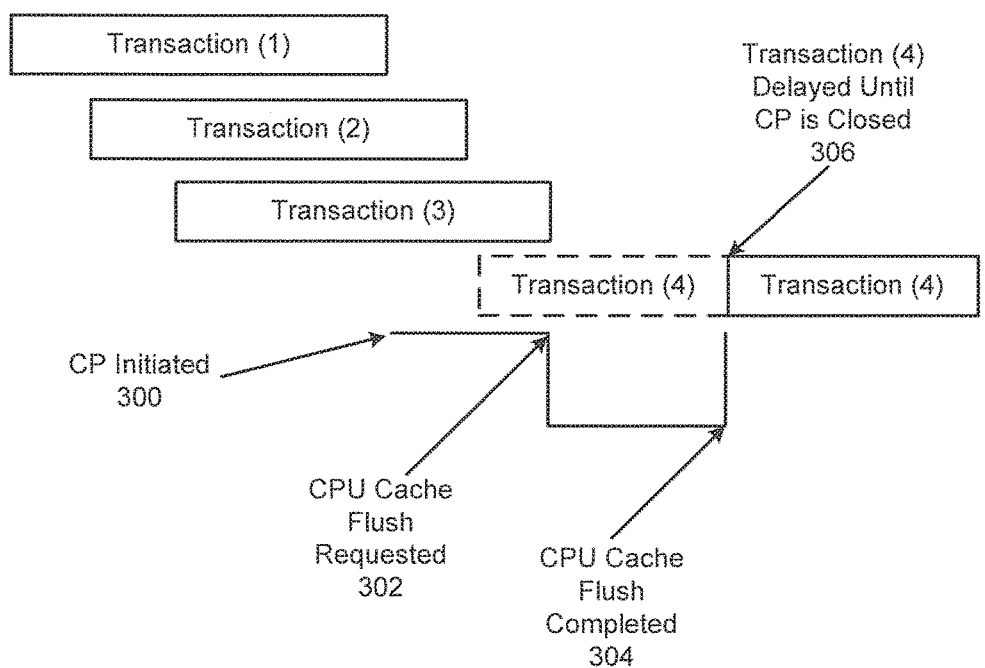
FIG. 3 illustrates combining multiple transactions and CP finalization for the PM controller based atomicity assurance apparatus, according to an example of the present disclosure.

FIG. 3 illustrates combining multiple transactions and CP finalization for the PM controller based atomicity assurance apparatus 100, according to an example of the present disclosure. With respect to atomicity, the PM control module 102 may combine transactions of multiple threads, instead of needing to track individual transactions. Specifically, as disclosed herein, the PM control module 102 may track a number of simultaneously active (i.e., opened) transactions by incrementing a transaction count on a transact signal and decrementing the transaction count on an etransact signal. This may provide for updates of several unrelated transactions to be combined. Further, the combined updates of the unrelated transactions may be committed or rejected as a single set. For example, as shown in FIG. 3, the PM control module 102 may combine simultaneous transactions. A CP event (e.g., a CP initiation) may delay start of subsequent transaction-open requests until all of the previous transactions have been flushed out of the CPU cache 208. Specifically, for the example of FIG. 3, the PM control module 102 may combine simultaneous transactions (1)-(3). A CP event at 300 may delay start of the subsequent transaction-open request for transaction (4) until all previous transactions (e.g., transactions (1)-(3)) have been flushed out of the CPU cache 208. At 302, the PM control module 102 may request a flush of the CPU cache 208. At 304, the flush requested for the CPU cache 208 may be completed. At 306, once the CPU cache 208 flush is completed, the PM control module 102 may initiate the transaction-open request for the transaction (4).

FIG. 4 illustrates the composition of a PM staging area 400 of the PM staging module 104, according to an example of the present disclosure. The PM staging module 104 may implement the PM staging area 400 that includes space allocated for a free area 402, an open CP 404, and examples of closed CPs 406, 408, and 410 (e.g., CP1, CP2, and CP3). In order to avoid latencies associated with fencing updates in the CPU cache 208, the PM control module 102 may aggregate updates in the active part (e.g., the area for the open CP 404) of the PM staging area 400. The PM staging area 400 may be organized as a ring buffer. As illustrated in FIG. 4, the PM staging area 400 may include an active area (e.g., the area for the open CP 404) that accepts ongoing uncommitted updates from the CPU 206, and the closed CPs 406, 408, and 410 with prepared CPs that may be propagated to the PM 210.

The PM control module 102 may periodically initiate a CP. The decision to initiate a CP may be based on a time value since a last CP and/or an amount of space in the free area 402 of the PM staging area 400. Alternatively or additionally, the decision to initiate a CP may be user defined and/or initiated by the application 202. With respect to the time between CP initiations, as the time between CP initiations increases, the time related to propagation of an update to the PM 210 increases, and therefore releasing CPs into the free area 402 may be delayed. Alternatively, if CPs are initiated too frequently, additional latency may be injected into processes related to CPs. Thus, the size of the PM staging area 400 and associated CP timing interval may be selected to cover all potential CPU write-back content, for example, for duration of several seconds.

As disclosed herein, the decision to initiate a CP may be user defined and/or initiated by the application 202. For example, a database application may initiate a CP when committing a transaction and reporting results of the transaction to a user.

With respect to exposure to uncommitted updates, the PM control module 102 may include store semantics such that if an address which maps to a region of the PM 210 is present in the open CP portion of the PM staging area 400, then a memory store operation initiated by the CPU 206 may overwrite this address in the open CP portion of the PM staging area 400. In the event that a CPU-initiated memory store does not map to any existing address in the open CP portion of the PM staging area 400, then a new instance of this address may be allocated in the open CP portion of PM staging area 400 to accommodate the memory store operation. A CPU-initiated memory store operation may be prohibited from modifying any element of the closed CP portion of the PM staging area 400. Further, a CPU-initiated memory store operation may be prohibited from modifying any element of the PM 210. Updates to the PM 210 may take place when the PM control module 102 flushes a closed CP (e.g., one of the closed CPs 406, 408, and 410) to the PM 210.

With respect to exposure to uncommitted updates, the PM control module 102 may include load semantics such that if the CPU 206 initiates a memory load operation from a PM address, which is present in either the open CP or the closed CP portions of the PM staging area 400, then a datum from the PM staging area 400 may be used in the reverse order of the CPs. If the PM address is not present in the PM staging area 400, the datum from the PM 210 may be used.

In the event of a power loss or other anomalies (e.g., a system crash) related to a system that includes the PM controller based atomicity assurance apparatus 100, the open CP 404 (i.e., content of the open CP 404) of the PM staging area 400 may be discarded. The closed CPs 406, 408, and 410 (i.e., content of the closed CPs 406, 408, and 410) of the PM staging area 400 may be flushed to the PM 210. For example, a backup power source may be used to provide sufficient power to the system that includes the PM controller based atomicity assurance apparatus 100 such that the closed CPs 406, 408, and 410 of the PM staging area 400 may be flushed to the PM 210. Alternatively or additionally, the PM staging area 400 may be implemented as a persistent PM staging area 400. Alternatively or additionally, upon restoration of power to a system that includes the PM controller based atomicity assurance apparatus 100, the closed CPs 406, 408, and 410 of the PM staging area 400 may be flushed to the PM 210. Flushing of the closed CPs 406, 408, and 410 may be initiated, for example, by the PM control module 102 and/or by other processes related to a system that includes the PM controller based atomicity assurance apparatus 100.

Figure 5:
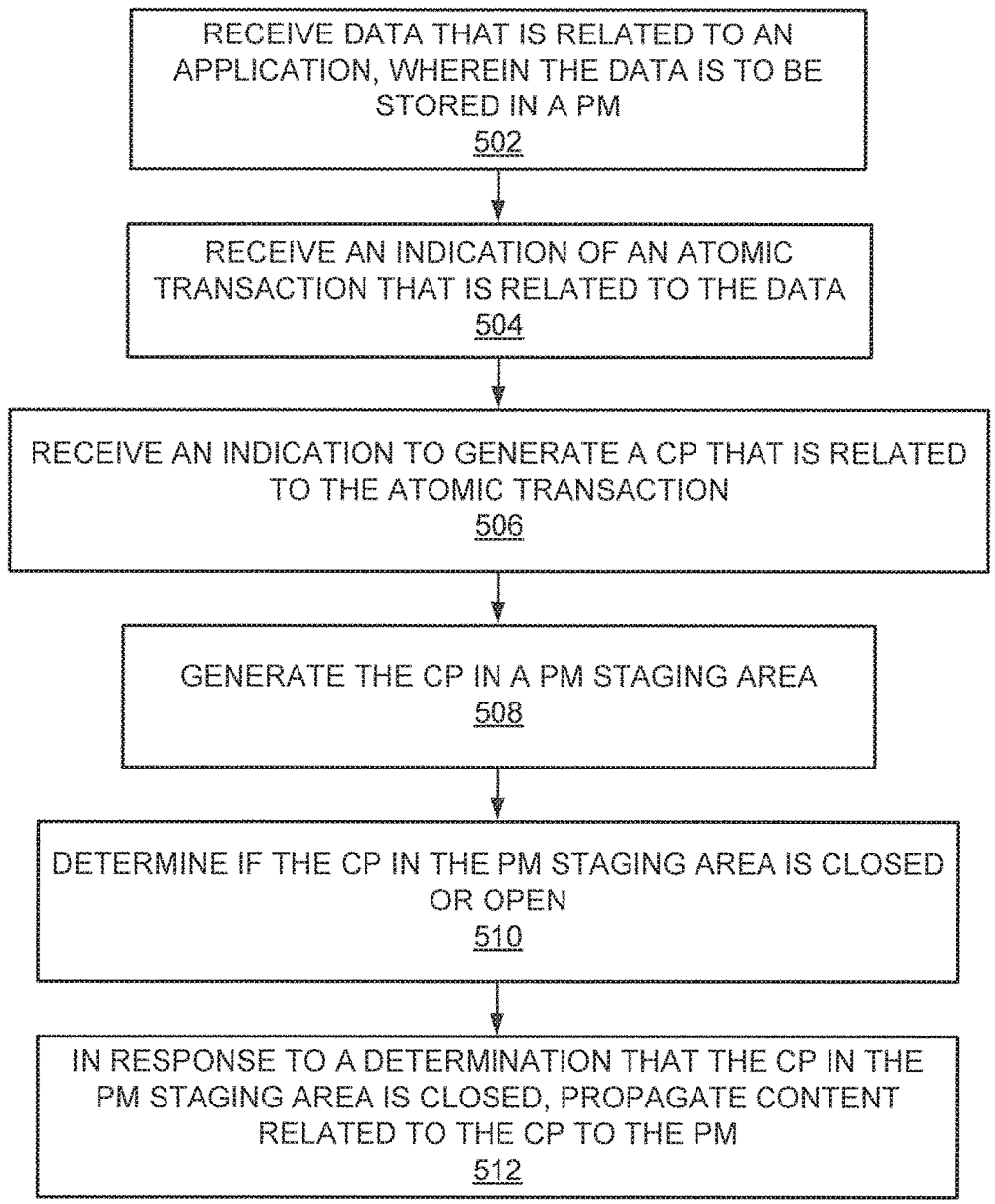
FIG. 5 illustrates a method for PM controller based atomicity assurance, according to an example of the present disclosure.
Figure 6:
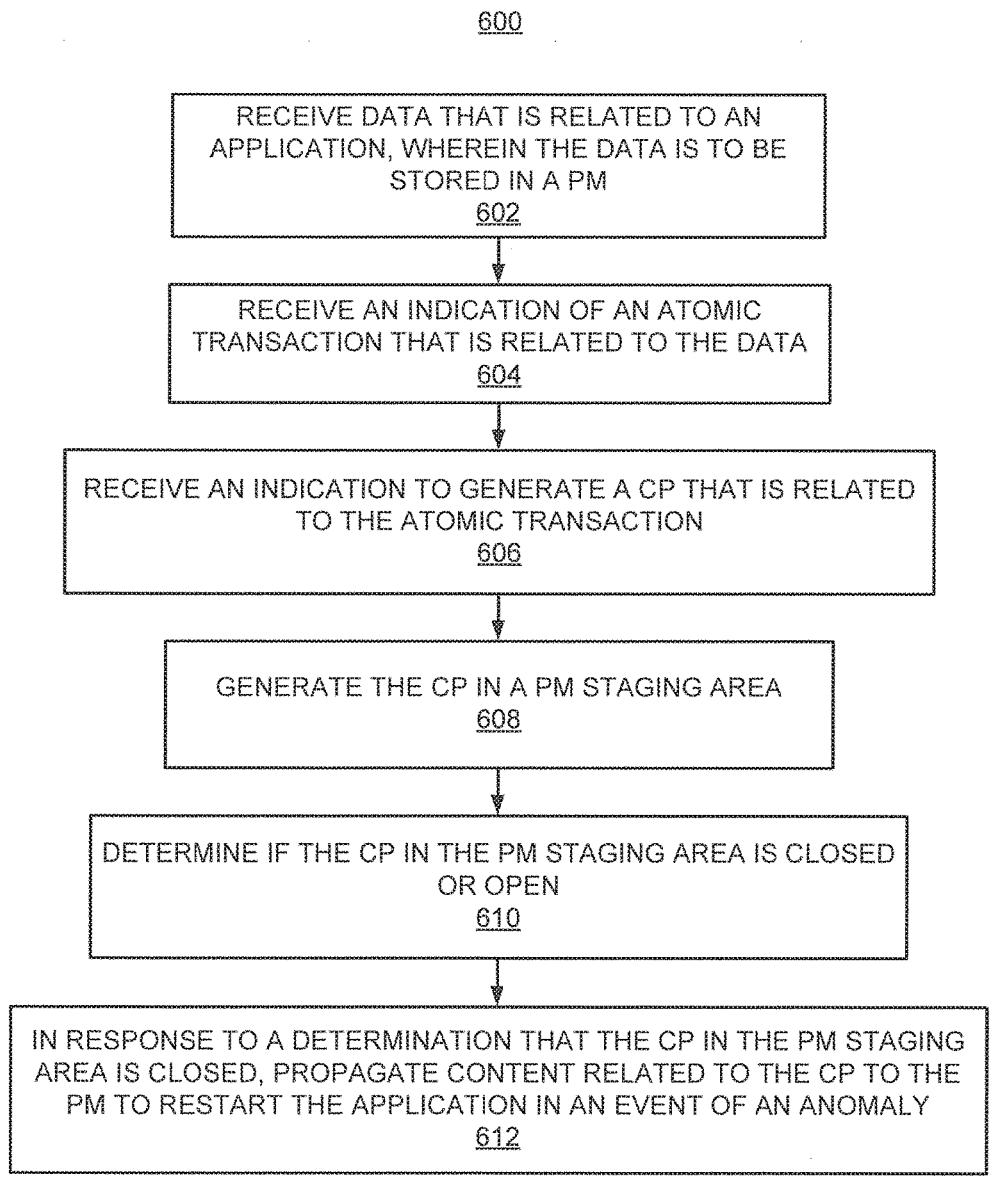
FIG. 6 illustrates further details of the method for PM controller based atomicity assurance, according to an example of the present disclosure.

FIGS. 5 and 6 respectively illustrate flowcharts of methods 500 and 600 for PM controller based atomicity assurance, corresponding to the example of the PM controller based atomicity assurance apparatus 100 whose construction is described in detail above. The methods 500 and 600 may be implemented on the PM controller based atomicity assurance apparatus 100 with reference to FIGS. 1-4 by way of example and not limitation. The methods 500 and 600 may be practiced in other apparatus.

Referring to FIG. 5, for the method 500, at block 502, the method may include receiving data that is related to an application, where the data may be stored in a PM. For example, referring to FIGS. 1 and 2, the method may include receiving data that is related to the application 202, where the data may be stored in the PM 210. According to an example, receiving data that is related to an application may further include receiving the data that is related to the application from a CPU cache of a CPU that processes the data. For example, referring to FIGS. 1 and 2, receiving data that is related to an application may further include receiving the data that is related to the application 202 from the CPU cache 208 of the CPU 206 that processes the data.

At block 504, the method may include receiving an indication of an atomic transaction that is related to the data. According to an example, as shown in FIGS. 1 and 2, receiving an indication of an atomic transaction that is related to the data may include receiving a transact signal to initiate an update transaction that is related to the atomic transaction, receiving an etransact signal to terminate the update transaction, and/or receiving a next transact signal to terminate the update transaction.

At block 506, the method may include receiving an indication to generate a CP that is related to the atomic transaction. According to an example, referring to FIGS. 1 and 2, receiving an indication to generate a CP that is related to the atomic transaction may further include receiving the indication to generate the CP from the application 202. According to an example, referring to FIGS. 1 and 2, receiving an indication to generate a CP that is related to the atomic transaction may further include receiving the indication (e.g., based on a determination by the PM control module 102) to generate the CP based on expiration of a predetermined time period between generation of CPs. According to an example, receiving an indication to generate a CP that is related to the atomic transaction may further include receiving the indication to generate the CP based on an amount of space available in the free area 402 of the PM staging area 400.

At block 508, the method may include generating the CP in a PM staging area. For example, referring to FIGS. 1, 2, and 4, the method may include generating the CP in the PM staging area 400. According to an example, generating the CP in a PM staging area may further include flushing a CPU cache upon generation of the CP. For example, referring to FIGS. 1, 2, and 4, generating the CP in a PM staging area may further include flushing the CPU cache 208 upon generation of the CP.

At block 510, the method may include determining if the CP in the PM staging area is closed or open. For example, referring to FIGS. 1, 2, and 4, the method may include determining (e.g., by the PM staging module 104) if the CP in the PM staging area 400 is closed (e.g., closed CP1 406, closed CP2 408, or closed CP3 410) or open (e.g., open CP 404). Block 510 may be implemented during recovery, for example, from a power failure or another anomaly.

At block 512, in response to a determination that the CP in the PM staging area is closed, the method may include propagating content related to the CP to the PM. For example, referring to FIGS. 1, 2, and 4, in response to a determination that the CP in the PM staging area 400 is closed (e.g., closed CP1 406, closed CP2 408, or closed CP3 410), the method may include propagating (e.g., by the PM staging module 104) content related to the CP to the PM. According to an example, propagating content related to the CP to the PM may further include propagating the content related to the CP to the PM to restart the application in an event of a power failure.

According to an example, in response to a determination that the CP in the PM staging area is open, the method may include discarding the content related to the CP. For example, referring to FIGS. 1, 2, and 4, in response to a determination that the CP in the PM staging area 400 is open (e.g., open CP 404), the method may include discarding the content related to the CP.

According to an example, the method may further include tracking active transactions related to the application by incrementing a transaction count upon receiving a transact signal to initiate an update transaction that is related to the atomic transaction, and decrementing the transaction count upon receiving an etransact signal to terminate the update transaction. For example, referring to FIGS. 1 and 2, the method may further include tracking (e.g., by the PM control module 102) active transactions related to the application 202 by incrementing a transaction count upon receiving a transact signal to initiate an update transaction that is related to the atomic transaction, and decrementing the transaction count upon receiving an etransact signal to terminate the update transaction.

According to an example, the method may further include implementing PM store semantics by determining if an address which maps to a region of the PM is present in an open CP portion of the PM staging area. In response to a determination that an address which maps to a region of the PM is present in an open CP portion of the PM staging area, for a PM store operation, the method may include overwriting the address in the open CP portion of the PM staging area.

According to an example, the method may further include implementing PM load semantics by determining initiation of a PM load operation from a PM address which is present in an open CP portion or a closed CP portion of the PM staging area. In response to a determination of initiation of a PM load operation from a PM address which is present in an open CP portion or a closed CP portion of the PM staging area, the method may include using a datum from the PM staging area in reverse order of CPs, and if the PM address is not present in the PM staging area, the method may include using a datum from the PM.

According to an example, the method may further include combining transactions related to the application until generation of the CP, preventing processing of further transactions related to the application until completion of a CPU cache flush, and processing the further transactions related to the application after completion of the CPU cache flush. For example, referring to FIGS. 1-3, the method may further include combining (e.g., by the PM control module 102) transactions related to the application 202 until generation of the CP, preventing (e.g., see FIG. 3) processing of further transactions related to the application 202 until completion of a CPU cache flush, and processing the further transactions (e.g., transaction (4)) related to the application 202 after completion of the CPU cache flush.

Referring to FIG. 6, for the method 600, at block 602, the method may include receiving data that is related to an application, where the data may be stored in a PM.

At block 604, the method may include receiving an indication of an atomic transaction that is related to the data.

At block 606, the method may include receiving an indication to generate a CP that is related to the atomic transaction.

At block 608, the method may include generating the CP in a PM staging area.

At block 610, the method may include determining if the CP in the PM staging area is closed or open.

At block 612, in response to a determination that the CP in the PM staging area is closed, the method may include propagating content related to the CP to the PM to restart the application in an event of an anomaly. For example, referring to FIGS. 1, 2, and 4, in response to a determination that the CP in the PM staging area 400 is closed (e.g., closed CP1 406, closed CP2 408, or closed CP3 410), the method may include propagating content related to the CP to the PM to restart the application 202 in an event of an anomaly.

Figure 7:
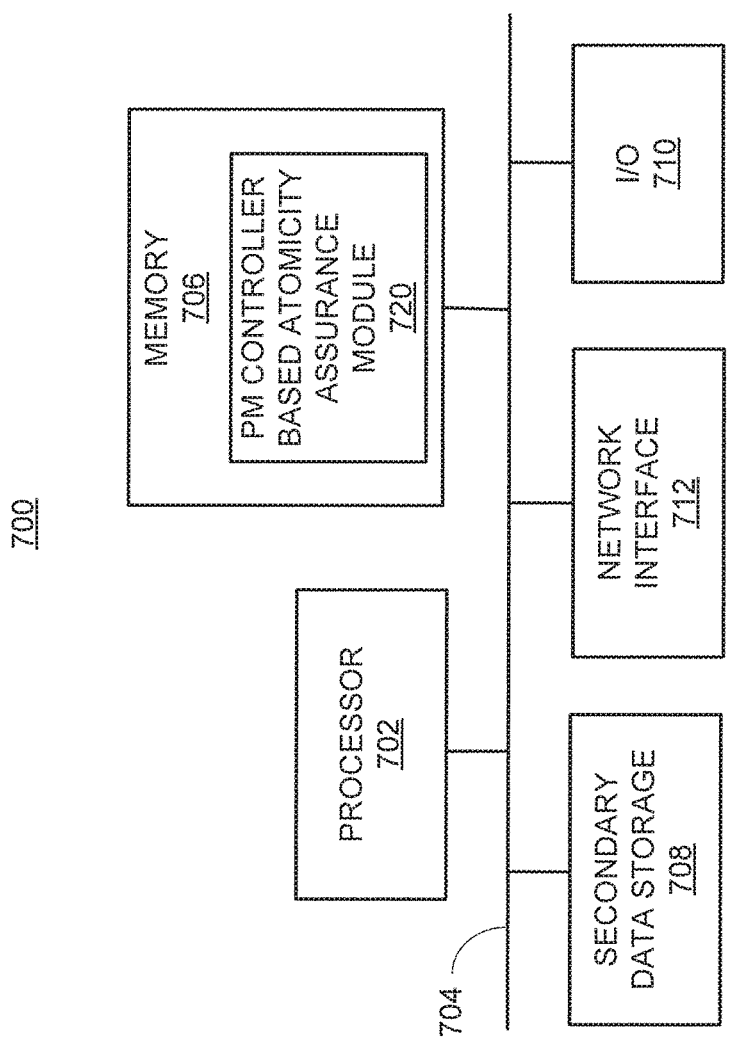
FIG. 7 illustrates a computer system, according to an example of the present disclosure.

FIG. 7 shows a computer system 700 that may be used with the examples described herein. The computer system may represent a generic platform that includes components that may be in a server or another computer system. The computer system 700 may be used as a platform for the apparatus 100. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions and other processes described herein. Commands and data from the processor 702 may be communicated over a communication bus 704. The computer system may also include a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include a PM controller based atomicity assurance module 720 including machine readable instructions residing in the memory 706 during runtime and executed by the processor 702. The PM controller based atomicity assurance module 720 may include the modules of the apparatus 100 shown in FIG. 1.

The computer system 700 may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for persistent memory (PM) controller based atomicity assurance, the method comprising:
   receiving data that is related to an application, wherein the data is to be stored in a PM;

receiving an indication of an atomic transaction that is related to the data;

receiving an indication to generate a consistency point (CP) that is related to the atomic transaction;

generating, by a processor, the CP in a PM staging area;

determining if the CP in the PM staging area is closed or open, wherein an open CP in the PM staging area is to accept an ongoing uncommitted update and a closed CP in the PM staging area is to include a prepared CP to be propagated to the PM; and in response to a determination that the CP in the PM staging area is closed, propagating content related to the CP to the PM.

2. The method of claim 1, further comprising:

in response to a determination that the CP in the PM staging area is open, discarding content related to the CP.

3. The method of claim 1, wherein receiving an indication of an atomic transaction that is related to the data further comprises at least one of:

receiving a transact signal to initiate an update transaction that is related to the atomic transaction;

receiving an etransact signal to terminate the update transaction; or receiving a next transact signal to terminate the update transaction.

4. The method of claim 1, further comprising:

implementing PM store semantics by determining if an address which maps to a region of the PM is present in an open CP portion of the PM staging area; and in response to a determination that the address which maps to a region of the PM is present in an open CP portion of the PM staging area, for a PM store operation, overwriting the address which maps to a region of the PM is present in the open CP portion of the PM staging area.

5. The method of claim 1, further comprising:

implementing PM load semantics by determining that a PM load operation from a PM address which is present in an open CP portion or a closed CP portion of the PM staging area has been initiated; and in response to a determination that a PM load operation from a PM address which is present in an open CP portion or a closed CP portion of the PM staging area has been initiated, using datum from the PM staging area in reverse order of CPs to implement the PM load semantics.

6. The method of claim 1, wherein receiving an indication to generate a CP that is related to the atomic transaction further comprises at least one of:

receiving the indication to generate the CP from the application; and receiving the indication to generate the CP based on expiration of a predetermined time period between generation of CPs.

7. The method of claim 1, wherein receiving an indication to generate a CP that is related to the atomic transaction further comprises:

receiving the indication to generate the CP based on an amount of space available in a free area of the PM staging area, wherein the PM staging area includes space allocated for the free area, for an open CP, and for a closed CP.

8. The method of claim 1, wherein generating the CP in a PM staging area further comprises:

flushing a central processing unit (CPU) cache upon generation of the CP.

9. The method of claim 1, wherein the PM staging area is a ring buffer.

10. The method of claim 1, wherein propagating content related to the CP to the PM further comprises:

propagating the content related to the CP to the PM to restart the application in an event of a power failure.

11. The method of claim 1, wherein the PM is a memristor based memory.

12. The method of claim 1, further comprising:

tracking active transactions related to the application by:
incrementing a transaction count upon receiving a transact signal to initiate an update transaction that is related to the atomic transaction; and decrementing the transaction count upon receiving an etransact signal to terminate the update transaction.

13. The method of claim 1, further comprising:

combining transactions related to the application until generation of the CP;

preventing processing of further transactions related to the application until completion of a central processing unit (CPU) cache flush; and processing the further transactions related to the application after completion of the CPU cache flush.

14. A persistent memory (PM) controller based atomicity assurance apparatus comprising:

a processor; and a memory storing machine readable instructions that when executed by the processor cause the processor to:
receive data that is related to an application, wherein the data is to be stored in a PM;

receive an indication of an atomic transaction that is related to the data;

receive an indication to generate a consistency point (CP) that is related to the atomic transaction;

generate the CP in a PM staging area;

determine if the CP in the PM staging area is closed or open, wherein an open CP in the PM staging area is to accept an ongoing uncommitted update and a closed CP in the PM staging area is to include a prepared CP to be propagated to the PM; and in response to a determination that the CP in the PM staging area is closed, propagate content related to the CP to the PM to restart the application.

15. A non-transitory computer readable medium having stored thereon machine readable instructions to provide persistent memory (PM) controller based atomicity assurance, the machine readable instructions, when executed, cause a processor to:

receive data that is related to an application, wherein the data is to be stored in a PM;

receive an indication of an atomic transaction that is related to the data;

receive an indication to generate a consistency point (CP) that is related to the atomic transaction;

generate the CP in a PM staging area;

determine if the CP in the PM staging area is closed or open, wherein an open CP in the PM staging area is to accept an ongoing uncommitted update and a closed CP in the PM staging area is to include a prepared CP to be propagated to the PM; and in response to a determination that the CP in the PM staging area is closed, propagate content related to the CP to the PM to restart the application in an event of an anomaly.

* * * * *